C. SPEAR.
Car Coupling.
No. 59,517
2 Sheets—Sheet 1.
Patented Nov. 6, 1866.
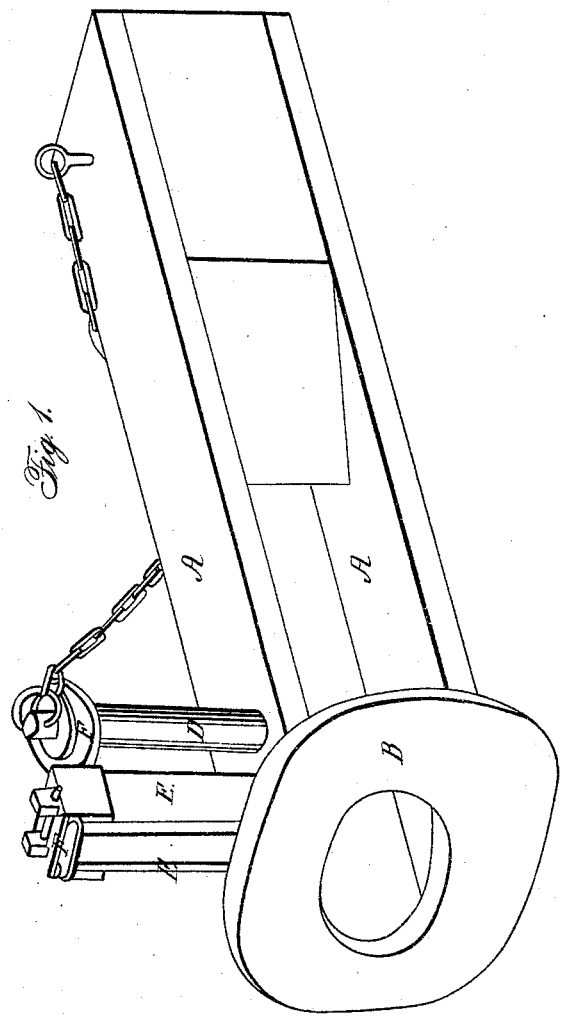
Witnesses:
R C Weightman
Thomas J Hurdle
Inventor:
C Spear
By Munn / Co
Attorneys

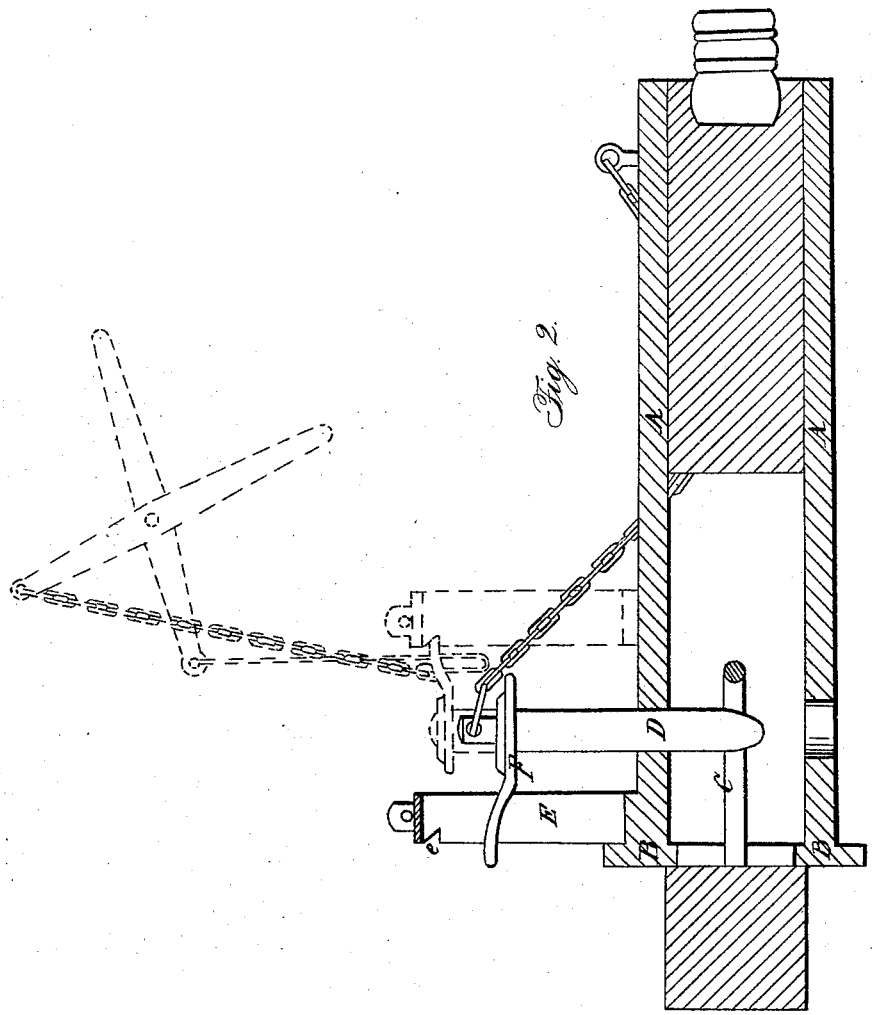

UNITED STATES PATENT OFFICE.

CHAUNCY SPEAR, OF CHAPINSVILLE, ASSIGNOR TO HIMSELF, HOLMES C. LUCAS, OF CANANDAIGUA, AND WALTER MARKS, OF HOPEWELL, NEW YORK.

IMPROVED CAR-COUPLING.

Specification forming part of Letters Patent No. 59,517, dated November 6, 1866.

*To all whom it may concern:*

Be it known that I, CHAUNCY SPEAR, of Chapinsville, in the county of Ontario and State of New York, have invented a new and useful Improvement in Car-Couplings; and I do hereby declare the following to be a full, clear, and exact description of the same, sufficient to enable one skilled in the art to which the invention appertains to make use of it, reference being had to the accompanying drawings, which form a part of this specification, and in which—

Figure 1 is a perspective view of my improvement. Fig. 2 is a longitudinal vertical section.

The improvement consists in an arrangement for holding the coupling-pin in its temporarily elevated position, from which it is dislodged and engaged with the link by the concussion of the cars.

In the drawings, A A are the plates of the draw-head, and B the face, through whose opening the link C passes, to be engaged by the coupling-pin D.

The pin is represented in Fig. 1 in its elevated position, ready for the link C, which is attached to the other car, and in Fig. 2 it is represented in the act of falling within the link.

E is a frame, which rises from the bunter-bar or draw-head, having a notch, e, on its forward edge or face, into which the plate F will catch when the pin D is raised and its head inclined toward the car.

The plate F is attached to the upper end of the coupling D, and the pin is likewise chained to the bunter-bar to prevent its being lost.

The shank of the plate F passes between the uprights of the frame, and the edge of its T-head being introduced into the notch e, the pin is retained in its elevated position until a jar comes on the car, when it is jerked out and the pin falls.

The frame E may be arranged behind the pin, as shown in red lines, Fig. 2, in which case the head of the pin may be made to engage with the notch in its front, or the plate F may be turned round and made to engage as before.

If desired, the pin may be raised by a lever and chain, as shown in red lines, Fig. 2, saving the exposure of the person between the cars in raising the pin for coupling when the cars are almost in contact.

Having described my invention, what I claim as new, and desire to secure by Letters Patent, is—

The combination of the pin D with an extended head or plate, F, and the notched frame E, operating as described to temporarily hold the pin, and release it by the concussion of the cars.

CHAUNCY SPEAR.

Witnesses:
 WALTER MARKS,
 G. L. ARCHER.